(12) United States Patent
Chang et al.

(10) Patent No.: US 9,134,487 B2
(45) Date of Patent: Sep. 15, 2015

(54) OPTICAL CONNECTOR WITH ALIGNMENT STRUCTURE

(71) Applicant: Hon Hai Precision Industry Co., Ltd., New Taipei (TW)

(72) Inventors: Chun-Yi Chang, New Taipei (TW); Jun-Bin Huang, Eastvale, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 46 days.

(21) Appl. No.: 13/938,187

(22) Filed: Jul. 9, 2013

(65) Prior Publication Data

US 2015/0016786 A1 Jan. 15, 2015

(51) Int. Cl.
*G02B 6/36* (2006.01)
*G02B 6/42* (2006.01)

(52) U.S. Cl.
CPC .................................. *G02B 6/4204* (2013.01)

(58) Field of Classification Search
CPC .. G02B 6/4292; G02B 6/4204; G02B 6/4206; G02B 6/42

USPC ...................... 385/53, 88, 92, 93, 94
See application file for complete search history.

(56) References Cited

U.S. PATENT DOCUMENTS 7,371,014 B2 * 5/2008 Willis et al. ..................... 385/89
7,614,802 B2 11/2009 Morioka
8,262,297 B2 9/2012 Castagna et al.

* cited by examiner

*Primary Examiner* — Jennifer Doan
(74) *Attorney, Agent, or Firm* — Wei Te Chung; Ming Chieh Chang

(57) ABSTRACT

An optical connector for optically coupling light between an optical fiber and an opto-electronic device (OED) includes a lens body having a first lens array, a second lens array, and a reflecting surface on the optical path between the first lens array and the second lens array for reflecting the light between the optical fiber and the OED; and a seat separated from the lens body and located under the lens body for receiving the lens body therein. The seat includes an alignment feature as a datum for aligning the OED and an alignment structure for aligning the lens body, and wherein there is a predetermined position relationship between the alignment feature and the alignment structure so that the lens body aligns with the OED when the lens body is assembled in the seat.

19 Claims, 6 Drawing Sheets

OPTICAL CONNECTOR WITH ALIGNMENT STRUCTURE

BACKGROUND OF THE INVENTION

1. Field of the Invention

The present disclosure relates to an optical connector, and more particularly to an optical connector having improved alignment structure.

2. Description of Related Art

In recent years, with increasing speed and capacity of data communication, the need is further rising for an optical fiber communication technology using an optical connector. A typical optical connector for coupling light from an optical fiber to an opto-electronic device (OED) or coupling light from an OED to an optical fiber comprises a lens array facing the OED so as to couple the light from or to the OED. To ensure the transmission of the light efficiently, the lens array must be aligned to the OED precisely, while a small misalignment can cause serious efficiency losses or deviation in the optical path. Thus, the alignment between the lens array and the OED is very important and critical. Active alignment techniques are often used to align the lens array to the OED, where the OED is activated and the position of the lens array is adjusted while the system is running so as to find the ideal position and then fix the lens array thereon. However the process said above requires special equipments and can be very expensive, and the process can be very time consuming.

U.S. Pat. No. 8,262,297 issued to Castagna et al. on Sep. 11, 2012 discloses a passive alignment technique, where an optical subassembly comprises a substrate having at least one perceptible alignment feature provided in a predetermined spatial relationship to an OED, and a lens body is adjusted and then secured to the substrate when the image of the substrate's alignment feature appears aligned relative to a viewing surface. Corresponding to the active alignment technique said above, the passive alignment technique without the need of the special equipment and can be cost down. However the process is still time consuming.

In view of the above, an improved optical connector is desired to overcome the problems mentioned above.

SUMMARY OF THE INVENTION

Accordingly, an object of the present disclosure is to provide an optical connector with improved alignment structure that can align with an opto-electronic device (OED) efficiently.

According to one aspect of the present disclosure, an optical connector is provided for optically coupling light between an optical fiber and a substrate. The optical connector comprises a lens body having a matching structure; a seat for mounting onto the substrate; and an opto-electronic device (OED) for electrically connecting with the substrate; wherein the seat defines an alignment feature for predetermining align the OED and an alignment structure for engaging with the matching structure of the lens body, and the OED is sandwiched between the lens body and the seat when the lens body is assembled in the seat.

Other objects, advantages and novel features of the disclosure will become more apparent from the following detailed description when taken in conjunction with the accompanying drawings, in which:

DETAILED DESCRIPTION OF THE INVENTION

Reference will now be made to the drawings to describe the present disclosure in detail.

Figure 1:
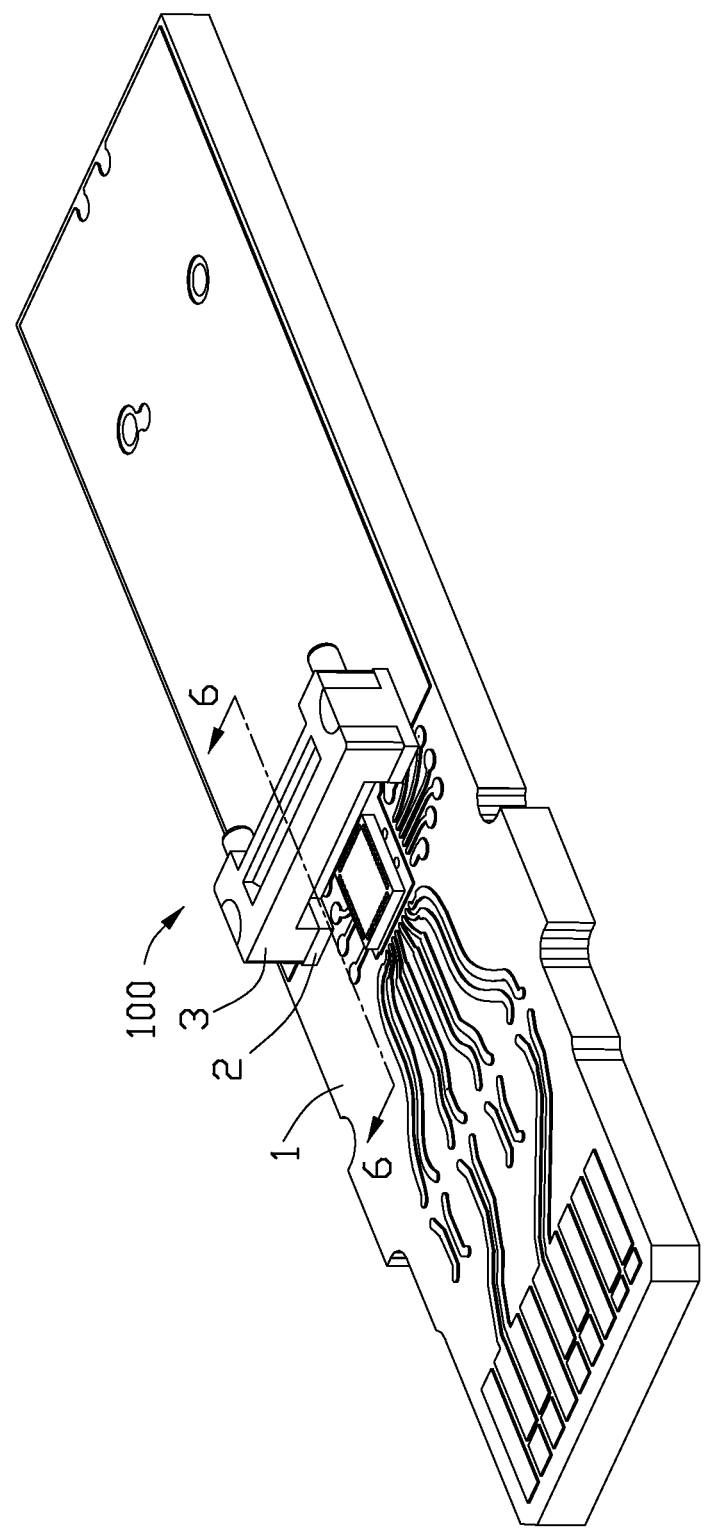
FIG. 1 is an assembled, perspective view of an optical connector assembly in accordance with a preferred embodiment of the present disclosure.
Figure 4:
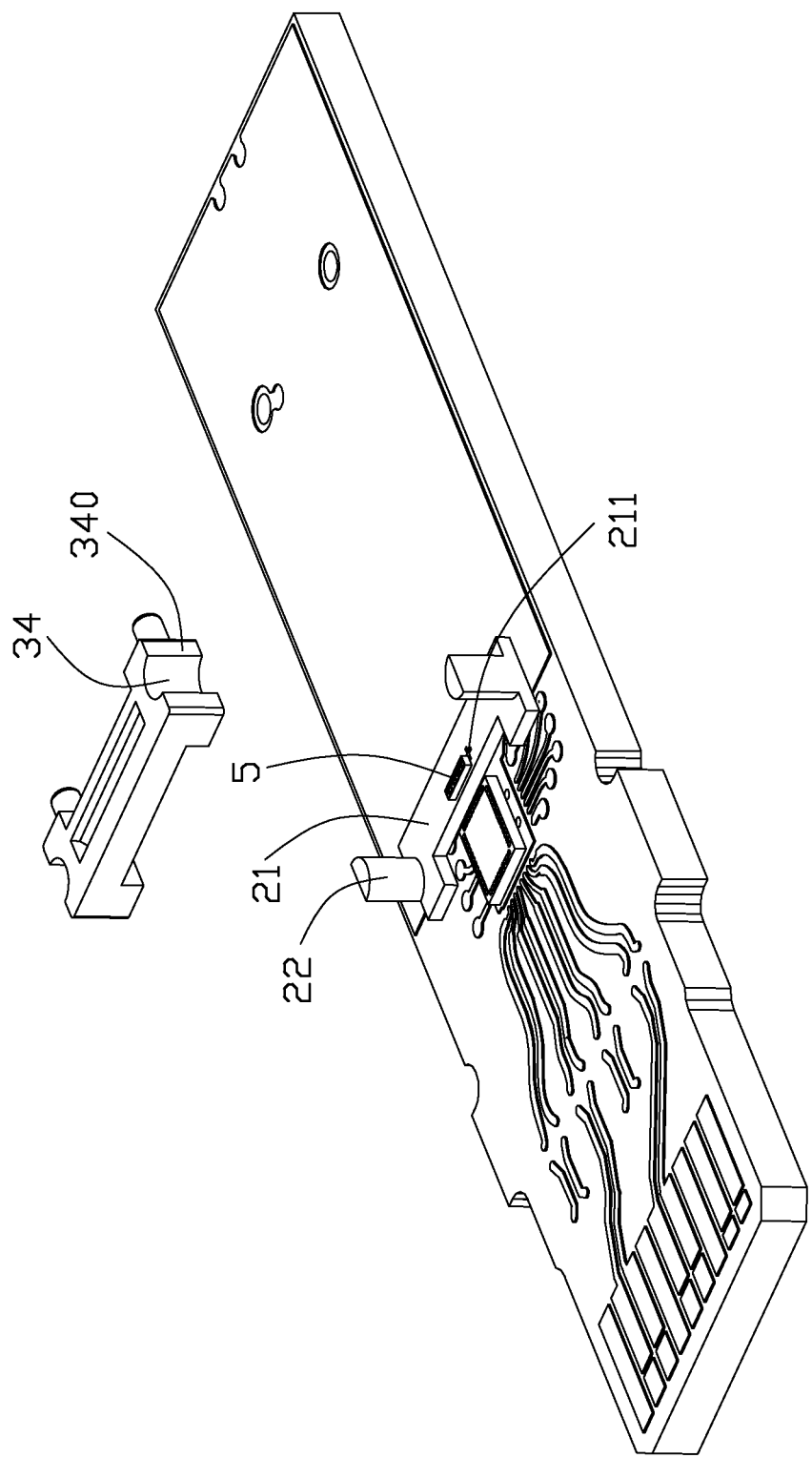
FIG. 4 is a perspective view of the optical connector assembly shown in FIG. 1, wherein the seat is assembled on the substrate while the lens body is separated from the seat.

Referring to FIG. 1 and FIG. 4, an optical connector for mating with an optical fiber (not shown) and mounting on a substrate 1 comprises an opto-electronic device (OED) 5, a seat 2 located on a substrate 1 and a lens body 3 assembled in the seat 2. An optical connector assembly 100 comprises the substrate 1, the OED 5 connecting with the substrate 1, the seat 2 located on the substrate 1 and the lens body 3 assembled in the seat 2.

Figure 3:
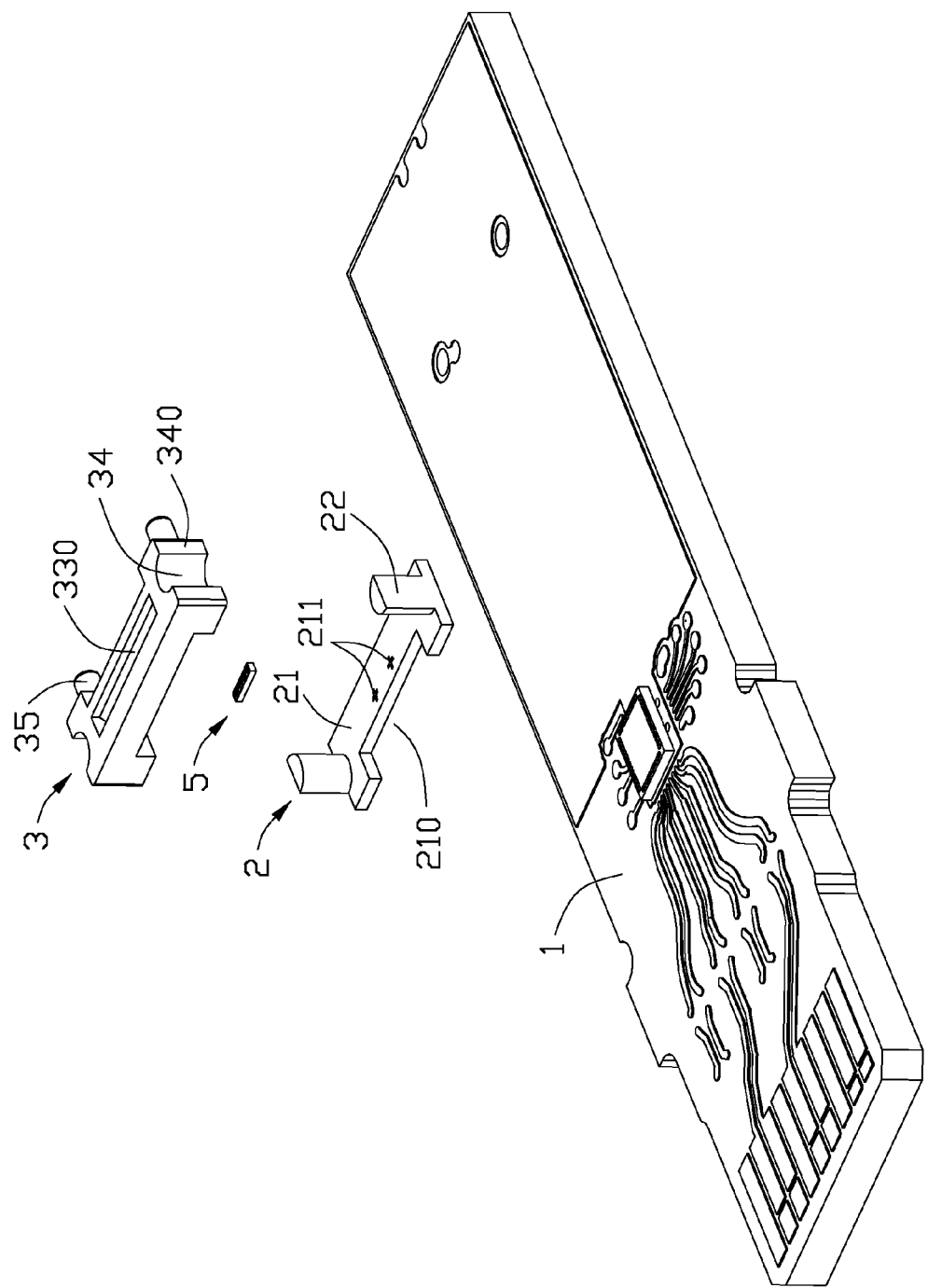
FIG. 3 is an exploded, perspective view of the optical connector assembly shown in FIG. 1.

Referring to FIG. 3, the seat 2 comprises a plate like base portion 21 and at least one alignment structure 22 for aligning the lens body 3. The alignment structure 22 is a post extending upwardly from an end of the base portion 21. In this embodiment of the disclosure, the post is half-cylindrical shaped, of course it can also be any other shapes. The base portion 21 comprises an opening 210 and forms a U shape toward a side thereof. The base portion 21 comprises at least one alignment feature 211. The alignment feature 211 is a mark configured on the base portion 21. The alignment feature 211 can be a mark such as a "+" or a "x" or any other symbols. In other embodiments, the alignment feature 211 can also be any other structures that can be used as a datum for aligning the OED 5. The alignment feature 211 is adjacent to the opening 210, and the alignment feature 211 is provided in a predetermined position relationship to the posts. The posts locate on two opposite sides of the opening 210.

Figure 2:
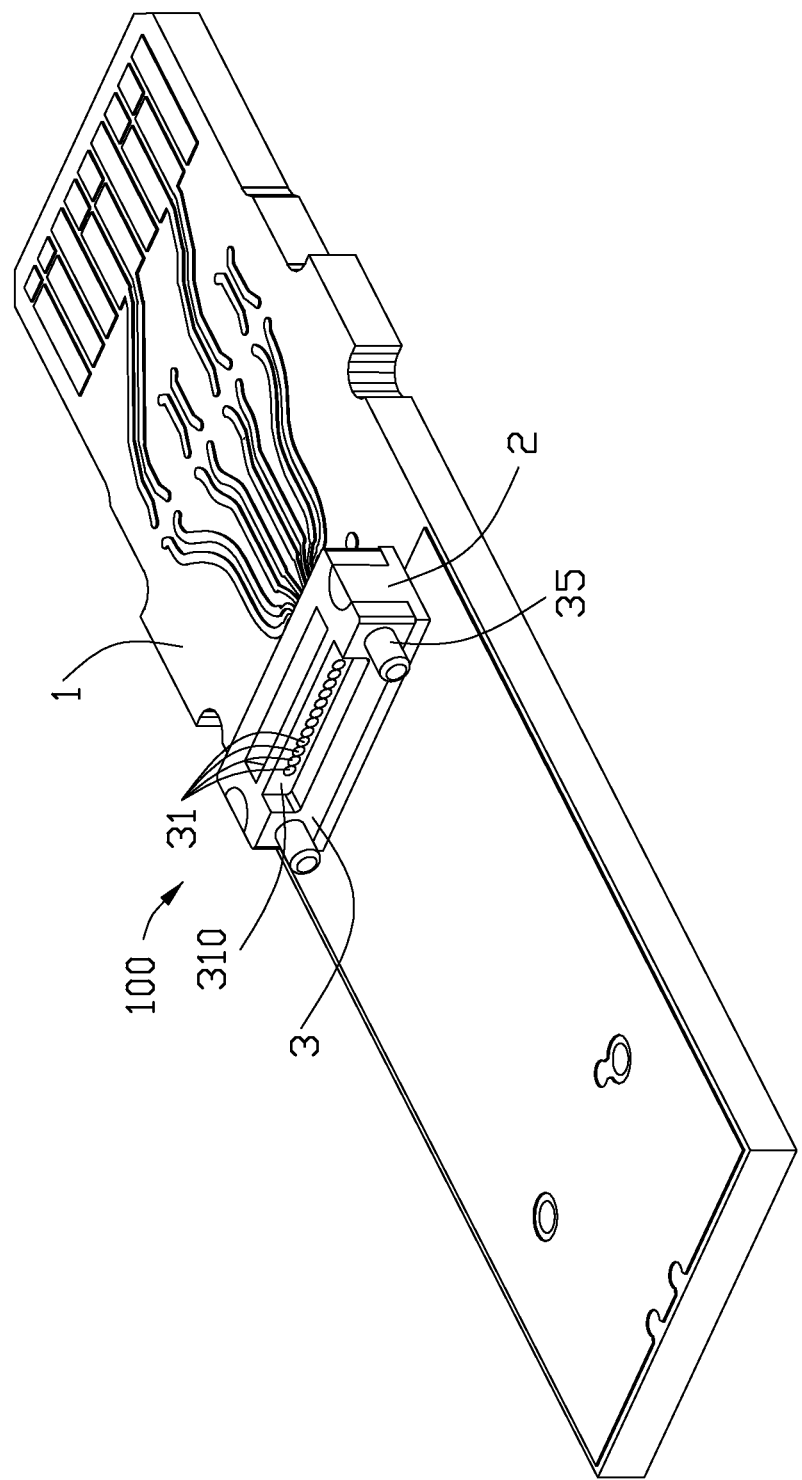
FIG. 2 is another view of the optical connector assembly shown in FIG. 1.
Figure 5:
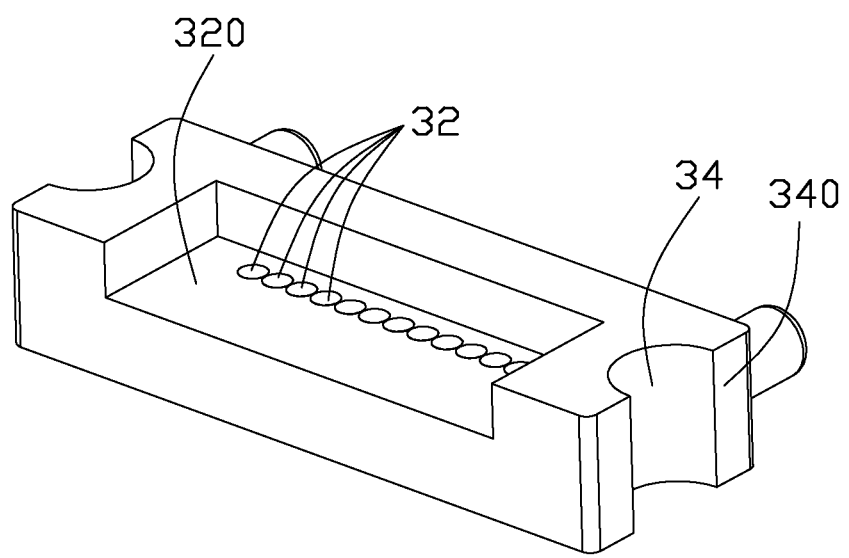
FIG. 5 is an perspective view of the lens body shown in FIG. 1.
Figure 6:
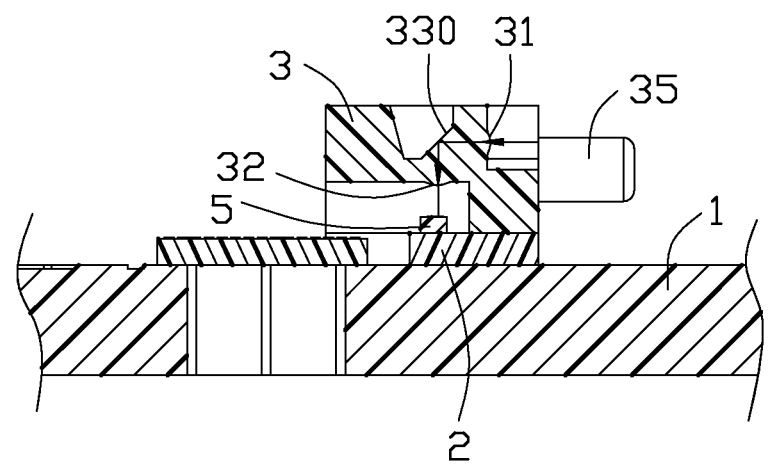
FIG. 6 is a cross sectional view of the optical connector shown in FIG. 1 along line 6-6.

Referring to FIGS. 2, 5 and 6, the lens body 3 comprises a first lens array 31 on a first surface 310, a second lens array 32 on a second surface 320 perpendicular to the first surface 310 and a reflecting surface 330 between the first and second surfaces 310, 320 for reflecting the light from the first lens array 31 to the second lens array 32 or vice versa. The first lens array 31 faces the optical fiber while the second lens array 32 faces the OED 5. The lens body 3 further comprises a pair of circular columns 35 perpendicular to the first surface 310 and extending towards the optical fiber for attaching the optical fiber thereon. The lens body 3 comprises two side surfaces 340 perpendicular to the first surface 310 and the second surface 320, and wherein each of the two side surfaces 340 comprises a matching structure 34 for matching with the alignment structure 22 of the seat 2. The matching structure 34 is a recess matching with the post on the seat 2.

Referring to FIG. 4 and FIG. 6, in the preferred embodiment, the seat 2 is pasted on the substrate 1. The OED 5 is fixed on the seat 2 by a die bonder and electrically connects the substrate 1 through wire bonding. The OED 5 can be a vertical cavity surface emitting laser (VCSEL) or a photo-diode (PD) for emitting or receiving the light.

In assembling, firstly, the seat 2 is located on the substrate 1; secondly, the OED 5 is aligned with the alignment feature 211 and fixed on the seat 2 by a die bonder and connects the substrate 1 through wire bonding; at last, the lens body 3 is assembled in the seat 2 in an up-to-down direction with the matching structure 34 of the lens body 3 matching with the alignment structure 22 of the seat 2. As a predetermined position relationship is defined between the alignment feature 211 and the alignment structure 22, as soon as the lens body 3 is assembled in the seat 2, the second lens array 32 aligns with the OED 5 precisely. Another aspect, as the alignment feature 211 and the alignment structure 22 is defined on the seat 2 rather than directly formed on the substrate 1, the manufacture is simple and cost down.

While preferred embodiments in accordance with the present disclosure has been shown and described, equivalent modifications and changes known to persons skilled in the art according to the spirit of the present disclosure are considered within the scope of the present disclosure as defined in the appended claims.

What is claimed is:

1. An optical connector for mating with an optical fiber and mounting onto a substrate comprising:
   a lens body for mating with the optical fiber and comprising a matching structure;
   a seat for mounting onto the substrate; and
   an opto-electronic device (OED) for electrically connecting with the substrate; wherein
   the seat defines an alignment feature to predetermine the position of the OED and an alignment structure to engage with the matching structure of the lens body, and the OED is located between the lens body and the seat when the lens body is assembled in the seat.

2. The optical connector as claimed in claim 1, wherein the matching structure is a recess while the alignment structure is a post.

3. The optical connector as claimed in claim 1, wherein the lens body comprises a first surface, a second surface perpendicular to the first surface and a reflecting surface between the first surface and the second surface, and wherein the first surface defines a first lens array while the second surface defines a second lens array.

4. The optical connector as claimed in claim 3, wherein the lens body comprises two side surfaces perpendicular to the first surface and the second surface, and wherein the matching structure is formed on the side surface.

5. The optical connector as claimed in claim 1, wherein the seat comprises a base portion, the alignment feature is a mark configured on the base portion while the alignment structure is a post extending upwardly from an end of the base portion.

6. The optical connector as claimed in claim 5, wherein the base portion comprises an opening, the mark is located adjacent to the opening.

7. The optical connector as claimed in claim 5, wherein the lens body is assembled in the seat in an up-to-down direction, the alignment structure guides and retains the lens body thereon.

8. The optical connector as claimed in claim 1, wherein the lens body comprises a pair of circular columns for attaching the optical fiber.

9. An optical connector assembly comprising:
   a substrate;
   a seat located on the substrate;
   an opto-electronic device (OED) set on the seat and electrically connecting with the substrate; and
   a lens body assembled in the seat; wherein
   the seat comprises an alignment feature aligning with the OED and an alignment structure aligning the lens body, and wherein there is a predetermined position relationship between the alignment feature and the alignment structure so that the lens body aligns with the OED when the lens body is assembled in the seat, further wherein the seat comprises a base portion located on the substrate, and wherein the alignment feature is a mark formed on the base portion and the alignment structure is a pair of posts extending upwardly from two ends of the base portion.

10. The optical connector assembly as claimed in claim 9, wherein the OED locates on the base portion.

11. The optical connector assembly as claimed in claim 9, wherein the seat is pasted on the substrate while the OED is fixed on the seat by a die bonder.

12. The optical connector assembly as claimed in claim 9, wherein the lens body comprises a side surface perpendicular to the substrate and a matching structure formed on the side surface and matching with the alignment structure of the seat.

13. The optical connector assembly as claimed in claim 9, wherein the lens body comprises a first lens array having optical axis parallel to the substrate, a second lens array having optical axis perpendicular to the substrate, and a reflecting surface on the optical path between the first lens array and the second lens array to alter the direction of the optical path.

14. The optical connector assembly as claimed in claim 9, wherein the lens body comprises a pair of circular columns parallel to the substrate for attaching the optical fiber.

15. An optical connector assembly comprising:
   a printed circuit board;
   a seat mounted upon the printed circuit board in a rough tolerant manner;
   an opto-electronic device (OED) mounted upon the seat and connected to the printed circuit board via a die bonder process in a fine tolerant manner; and
   a lens body assembled to the seat in a vertical direction perpendicular to said printed circuit board, and including a lens array thereof; wherein
   an aligning structure formed on the seat and a matching structure formed on the lens body to be coupled with each other to precisely align the lens body with the seat in the vertical direction so as to assure correct transmission between the OED and the lens array of the lens body.

16. The optical connector assembly as claimed in claim 15, wherein the aligning structure is located on two opposite ends of the seat in a transverse direction perpendicular to said vertical direction, and the matching structure is located on two opposite ends of the lens body in said transverse direction.

17. The optical connector assembly as claimed in claim 16, wherein said lens body further includes another lens array communicating with said lens array via reflectors in a right angle manner.

18. The optical connector assembly as claimed in claim 17, wherein said another lens array communicate with an exterior in a longitudinal direction perpendicular to said vertical direction and said transverse direction.

19. The optical connector assembly as claimed in claim 18, wherein both said seat and said lens body commonly define a space to communicatively receive therein a side region of an electronic package mounted upon the printed circuit board.

* * * * *